United States Patent
Van Rensburg (10) Patent No.: US 10,860,713 B2
(45) Date of Patent: Dec. 8, 2020

(54) DATA BREACH DETECTION SYSTEM (71) Applicant: RingCentral, Inc., Belmont, CA (US)

(72) Inventor: Christopher Van Rensburg, Foster City, CA (US)

(73) Assignee: RingCentral, Inc., Belmont, CA (US)

( * ) Notice: Subject to any disclaimer, the term of this patent is extended or adjusted under 35 U.S.C. 154(b) by 38 days.

(21) Appl. No.: 16/280,411

(22) Filed: Feb. 20, 2019

(65) Prior Publication Data

US 2020/0265136 A1    Aug. 20, 2020

(51) Int. Cl.
  G06F 21/55    (2013.01)
  G06N 20/00    (2019.01)
  G06K 9/62     (2006.01)
  G06F 21/16    (2013.01)
  G06F 21/57    (2013.01)

(52) U.S. Cl.
  CPC ........... G06F 21/552 (2013.01); G06F 21/16 (2013.01); G06F 21/577 (2013.01); G06K 9/623 (2013.01); G06N 20/00 (2019.01)

(58) Field of Classification Search
  CPC ...... G06F 21/552; G06F 21/16; G06F 21/577; G06N 20/00; G06K 9/623
  USPC .......................................................... 726/22
  See application file for complete search history.

(56) References Cited

U.S. PATENT DOCUMENTS

| | | | |
|---|---|---|---|
| 9,892,442 B2 | 2/2018 | Barday | |
| 10,045,218 B1* | 8/2018 | Stapleton | H04W 12/12 |
| 2006/0036440 A1* | 2/2006 | Kunkel | G10L 17/26 |
| | | | 704/270 |
| 2008/0162731 A1* | 7/2008 | Kauppinen | G06Q 30/02 |
| | | | 709/250 |
| 2008/0229415 A1 | 9/2008 | Kapoor et al. | |
| 2009/0007220 A1* | 1/2009 | Ormazabal | H04L 63/1466 |
| | | | 726/1 |
| 2009/0144141 A1* | 6/2009 | Dominowska | G06Q 30/02 |
| | | | 705/14.41 |
| 2012/0233311 A1* | 9/2012 | Parker | H04L 43/00 |
| | | | 709/224 |
| 2014/0254807 A1* | 9/2014 | Fonseca, Jr. | H04R 29/00 |
| | | | 381/56 |
| 2016/0092779 A1* | 3/2016 | Werth | G06N 3/0445 |
| | | | 706/48 |
| 2018/0219723 A1* | 8/2018 | Scarpelli | H04L 63/1425 |

(Continued)

*Primary Examiner* — Alexander Lagor
*Assistant Examiner* — Moeen Khan (57) ABSTRACT

A method includes receiving marketing campaign associated data. The marketing campaign associated data is data associated with telephony communications from one or more telemarketing sources to a plurality of users. The method further includes applying a machine learning algorithm to the received marketing campaign associated data that determines anomalies associated with a subset of users of the plurality of users. The anomalies are determined based on audio signature of the telephony communications or based on telephony communications from a same source being disguised as different sources. The method includes identifying a marketing content within the telephony communications for the subset of users. The method also includes determining one or more common attributes between users within the subset of users and identifying a source of data breach based on the marketing content and further based on the one or more common attributes.

20 Claims, 7 Drawing Sheets

(56) References Cited

U.S. PATENT DOCUMENTS

| | | | |
|---|---|---|---|
| 2018/0308133 A1* | 10/2018 | Geist, Jr. | G06Q 30/0271 |
| 2018/0309775 A1* | 10/2018 | Zou | H04L 63/1416 |
| 2019/0073693 A1* | 3/2019 | Moukaddem | G06N 20/00 |
| 2020/0007934 A1* | 1/2020 | Ortiz | H04N 21/23424 |

* cited by examiner

DATA BREACH DETECTION SYSTEM

TECHNICAL FIELD

The present disclosure relates generally to the field of computer and data security in a communications environment. More specifically, and without limitation, this disclosure relates to systems and methods for detecting a data breach associated with a user.

BACKGROUND

Use of personal information in on-line environments has become an integral part of daily life. For example, credit cards are used routinely for e-commerce purchases. As another example, medical records, financial records, etc., are often stored in the cloud. As yet another example, transaction history of a user may be collected and stored by enterprise institutions, such as Amazon®, Google®, Facebook®, etc. Hacking of enterprise institutions has been on the rise and has led to personal data of users stored at these institutions being compromised. Users' personal information are subsequently sold on darknets to organizations that use that information to market products and services to those users and customers (hereinafter marketing campaigns).

For example, a data breach of a healthcare provider enables a hacker to sell the personal information to marketers of healthcare services or to drug manufacturers to launch marketing campaigns for their medical treatments, products, drugs, etc., based on the medical profile of the patient. Similarly, a data breach of a financial institution enables a hacker to sell the personal information to marketers of financial products to launch marketing campaigns for their services such as brokerage accounts, angel investment funding, checking accounts, loans, etc., based on the financial profile of the user.

Institutions initiating marketing campaigns are referred to as telemarketing source(s) throughout the application. The telemarketing source often uses some sort of electronic communication system to launch the marketing campaigns for products/services. For example, SMS may be utilized by a telemarketing source to launch its marketing campaigns. Similarly, telephone calls may be used by a telemarketing source or a robocall service to launch marketing campaigns. Other forms of marketing campaigns are also possible such as emails, or online advertising, etc. Often when a data breach is discovered, it is after it has caused substantial damage. It is appreciated that a data breach may refer to a malicious act associated with hacking and data being compromised may refer to data being compromised without hacking and/or malice. Data breach and data being compromised are used throughout the application synonymously and interchangeably.

SUMMARY

The present disclosure arises from the realization that currently there is no system that can detect possible data breaches of personal or sensitive commercial information based on electronic communications. According to some embodiments, it is desirable to detect possible data breaches of confidential information such as personal information, commercial information, etc. based on the marketing campaigns launched using electronic communications by a telemarketing source. According to some example embodiments, a method includes receiving marketing campaign associated data. The marketing campaign associated data is data associated with telephony communications, e.g., SMS, voice message, telephone calls, etc., from one or more telemarketing sources to a plurality of users. The method further includes applying a machine learning algorithm to the received marketing campaign associated data that determines anomalies associated with a subset of users of the plurality of users. The anomalies are determined based on audio signature of the telephony communications or based on telephony communications from a same source being disguised as different sources. The method includes identifying a marketing content within the telephony communications for the subset of users. The method also includes determining one or more common attributes between users within the subset of users and identifying a source of data breach based on the marketing content and further based on the one or more common attributes It is appreciated that in some embodiments the anomalies are based on a pattern of user behavior responsive to receiving the telephony communications. The pattern of user behavior is selected from a group consisting of hanging up the telephony communications in less than a predetermined amount of time, hanging up the telephony communications without audio response from the user, declining to answer telephony communications from a number sharing a same area code and first three digits of the user phone number, and declining to answer telephony communications from a number sharing a same area code and telephone number as the user by manipulating the user device.

According to some examples, determining anomalies associated with the subset of users is based on a pattern associated with a marketing campaign. In some embodiments, the audio signature is based on a length of a message, an audio signature of a background noise, or a length of time prior to start of a voice message.

It is appreciated that a machine learning algorithm automatically learns from patterns associated with other marketing campaigns to automatically update the machine learning algorithm. According so some examples, the method may further include automatically contacting a subset of the one or more telemarketing sources and gathering additional data based on the contacting. Thus, the identifying the marketing content and the identifying the source of data breach is further based on the gathered additional data.

These and other features and aspects of the concepts described herein may be better understood with reference to the following drawings, description, and appended claims.

DETAILED DESCRIPTION

The example embodiments herein are directed to identifying possible data breaches of enterprises sources based on the marketing campaigns, via electronic communications by a telemarketing source, that are directed to users. The embodiments herein provide a mechanism through which the marketing campaigns, via electronic communications, such as SMS, voice message, telephone calls, emails, etc., can be accessed and analyzed to determine whether a data breach has occurred. In some examples, the mechanism may be a centralized voice over IP (VoIP) system. In other examples, the mechanism may be a monitoring system receiving data from the users and/or monitoring electronic communications directed to users. It is appreciated that references to the users throughout the application refer to users which a telemarketing source has targeted in its marketing campaigns to offer products/services.

It is appreciated that the pattern of electronic communications in marketing campaigns may be used to identify anomalies associated with a subset of the users and their respective electronic communications. Anomalies may be an indication that a data breach has occurred. For example, an increase in number of marketing campaigns directed to a user along with a pattern and/or content of electronic communications in the marketing campaigns may be an indication that the user data has been compromised and subsequently sold in darknets to a telemarketing source. The system, as described, further identifies the marketing content, to determine the potential sources of data breach. It is appreciated that the potential source of data breach refers to a data breach associated with an enterprise institution. For example, the potential source of data breach may be determined to be a healthcare provider if the marketing content promotes a particular drug for a specific medical condition. Additionally, in one example, common attributes among the users where their data has been breached are identified. For example, querying a human resources information system used by the user's employer may identify common attributes, e.g., enrollment in a particular medical plan, enrollment in a particular retirement/investment plan, etc., thereby enabling the list of potential sources of data breach to be further narrowed down. As such, a source of data breach can be identified with high confidence.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

It is appreciated that throughout the application identifying a possible data breach and identifying the potential source of a data breach are described within the context of marketing campaigns using telephony communications, e.g., text messaging, voice messages, telephone calls, etc., but references to the foregoing should not be construed as limiting the scope of the example embodiments as they are referenced merely for illustrative purposes. For example, the described embodiments are equally applicable to other electronic communications such as email, messaging communications, etc.

Figure 1:
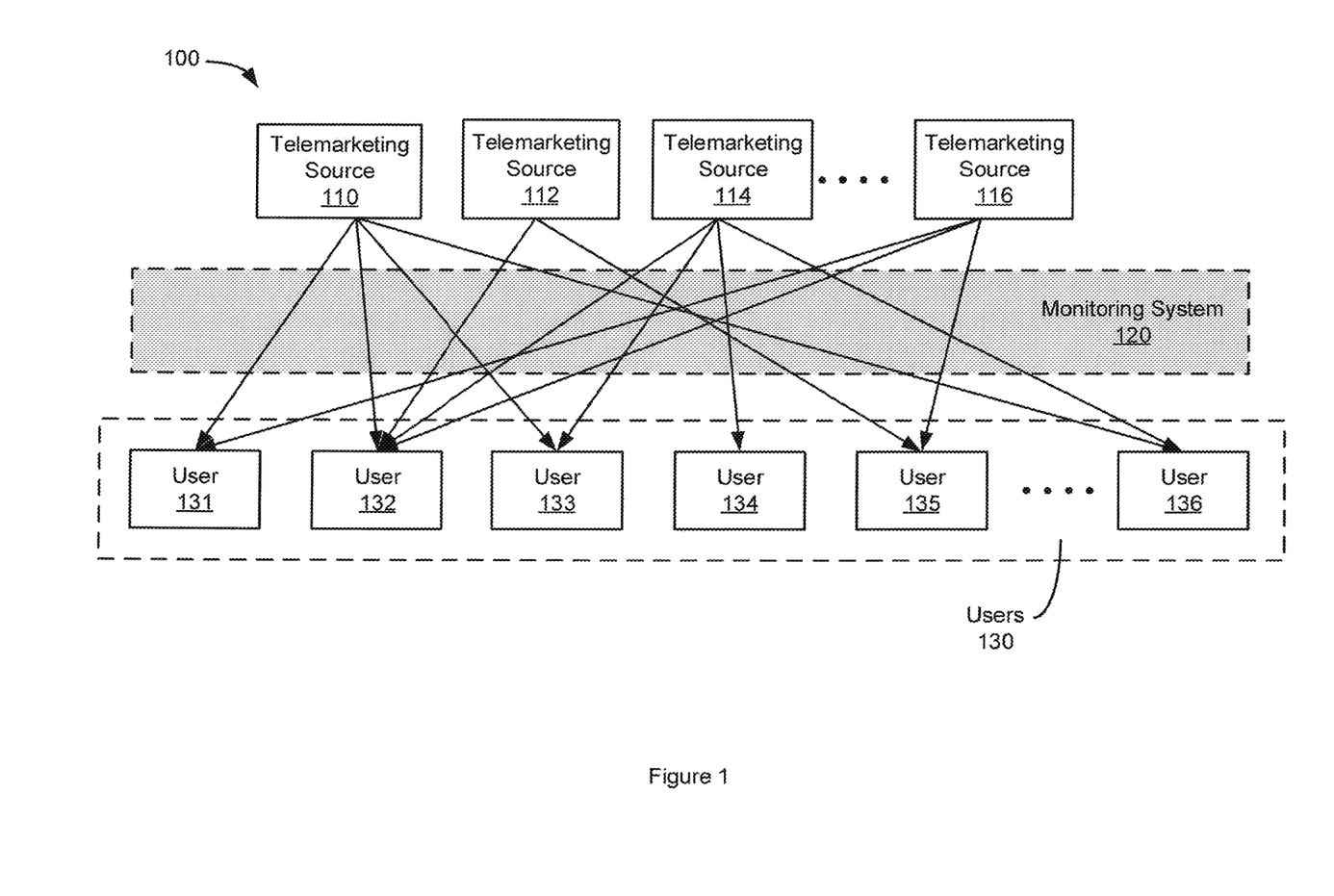
FIG. 1 is a block diagram depicting an example of a system suitable for identifying data breaches based on marketing campaigns launched, via electronic communications, that are directed to users according to some embodiments.

FIG. 1 is a block diagram depicting an example of a system suitable for determining data breaches based on the marketing campaigns, via electronic communications, that are directed to users according to some embodiments. System 100 includes telemarketing sources 110, 112, 114, . . . , 116 for launching marketing campaigns via electronic communications directed to the users 130. The system 100 further includes a monitoring system 120 for monitoring the electronic communications (e.g., pattern of the electronic communications, content of the electronic communications, etc.) launched by the telemarketing sources 110, 112, 114, . . . , 116, directed to the users 130. The electronic communications may be any form of electronic communication system, e.g., SMS, voice message, voice calls, emails, etc. Telemarketing sources 110, . . . , 116 initiate marketing campaigns, via electronic communications, directed to one or more users. For example, the telemarketing source 110 initiates a marketing campaign, via an electronic communication, directed to users 131, 132, 133, and 136. Telemarketing source 112 initiates a marketing campaign, via an electronic communication, directed to users 132 and 135. Telemarketing source 114 initiates a marketing campaign, via an electronic communication, directed to users 132, 133, 134, and 136. Telemarketing source 116 initiates a marketing campaign, via an electronic communication, directed to users 131, 132, and 135.

The monitoring system 120, e.g., VoIP telephony system, is configured to monitor the electronic communications from the telemarketing source(s) 110, . . . , 116 to the users 130. Based on the pattern of the electronic communications, the monitoring system 120 identifies anomalies in electronic communications for a subset of the users. The anomalies may be indicative that the user data may have been breached. For example, an increase in marketing campaigns directed to a user may be recognized as an anomaly and an indication that the user data has been breached. The user data may be used for nefarious purposes, such as subsequently being sold in darknets to unauthorized telemarketers. Accordingly, a surge in marketing campaigns from a single telemarketing source may be an indication that the user data were breached and subsequently provided to the telemarketing source.

In some examples, the anomaly may be detected by determining that the electronic messages are being disguised as being initiated from different telemarketing sources even though they are in fact being initiated from a single telemarketing source, e.g., electronic messages being transmitted from a single source but with different telephone numbers, electronic messages being transmitted from a single source but with different email addresses, etc. An anomaly may be detected using audio analysis, e.g., audio signature of the background noise being consistent with marketing campaigns such as clicking of keyboards in the background, audio signature of the recorded voice being consistent with marketing campaigns, a predetermined amount of time prior to beginning of actual voice message, duration of the voice message being consistent and similar to other marketing campaigns, etc. In other examples, the anomaly is detected for electronic communications during certain periods of time, e.g., calls between 9 am to 3 pm, emails between 11 pm to 6 am, etc. In other examples, the anomaly may be detected if the electronic communications are disguised as being from a source familiar to the user. For example, an anomaly may be detected if the telephone number of the caller shares the same area code and the first 3 digits of the user's telephone number. In another example, an anomaly is detected if the telephone number of the caller is the same as the user's telephone number. In yet another example, an anomaly is detected if the telephone number of the caller is the same as the phone number in the user's contact whereas in reality the call is from a different number but is rather being disguised. In another example, an anomaly is detected if the email address of the sender shares information in common with information known by the user such as the last name of a person in the user's contact list.

It is appreciated that in some embodiments, the anomaly may be detected based on the user behavior and a pattern of user behavior. For example, the user pattern of picking up a call and hanging up within a certain period of time, e.g., less than 2 seconds, or picking up a call and hanging up without saying anything, etc., may be indicative of anomaly and a marketing campaign. In other examples, the user behavior of manipulating the device, e.g., pressing a button or a soft button to decline a call or ignore a call, may be indicative of an anomaly and a marketing campaign. In yet another example, user behavior of declining a call from certain phone numbers, e.g., same phone number as the user, same area code and same first 3-digit number, etc., may be indicative of an anomaly and a marketing campaign. It is appreciated that in some embodiments, anomaly is detected when the monitoring system 120 automatically calls or initiates electronic communications to the telemarketing source(s) in order to gather additional data. For example, when a voice message is received, the monitoring system 120 may automatically call the telemarketing source(s) to gather additional information, e.g., based on a prerecorded message, greeting, etc. The gathered information may be used to further determine whether the anomaly is caused by a data breach.

It is appreciated that once the subset of users whose confidential information such as personal data has been breached is identified, e.g., users 110 and 114 in this example, the content of the electronic communications is analyzed, by the monitoring system 120, to identify the potential source(s) of data breach. For example, the monitoring system 120 identifies the marketing content, e.g., particular drug (e.g., for psoriasis, for tinnitus, for arthritis, etc.), particular medical treatment, particular weight loss program, particular investment opportunity, particular loan option, particular vehicle for sale, particular product related to a recent online purchase such as sunglasses or home improvement product, particular user attributes such as demographic information (sex, age, height, weight, etc.), etc. Once the marketing content is identified, the potential sources of data breach may be identified. For example, if the marketing content is medical in nature, then the potential source of data breach may be a medical provider, insurance company, etc. For example, drugs or medical treatments related to a user's medical condition such as past surgery, past/current medication, past/current illness, etc., may be an indication that the potential source of data breach may be a medical provider, insurance company, doctor's office, cloud data storage for medical provider/insurance company/doctor's office, etc. If the marketing content is financial in nature, e.g., car loan, retirement account, credit card offering, etc., then the potential source of data breach may be a financial institution. If the marketing content is product-driven, then the potential source of data breach may be an online retailer or a brick and mortar store, e.g., Amazon®, Walmart®, HomeDepot®, etc., and depending on the type of product being marketed, e.g., product being marketed is related to a recent purchase on Amazon®, product being marketed complements a recent purchase at HomeDepot®, etc., the potential source of data breach may further be narrowed down. If the marketing content is online services in nature, e.g., airline booking, hotel accommodations, online realtors, dating services, food delivery services, auction services, etc., then the potential source of data breach may be an online store/service. It is appreciated that while throughout the application references are made to personal information, the embodiments should not be construed as limited thereto. For example, the embodiments are equally applicable to any confidential information such as commercial data, trade secret, healthcare information, etc.

It is appreciated that in some embodiments, the monitoring system 120 automatically calls or initiates electronic communications to the telemarketing source(s) in order to gather additional data to determine the type of product/service being marketed to the users. For example, when a voice message is received, the monitoring system 120 may automatically call the telemarketing source(s) to gather additional information, e.g., based on a prerecorded message, greeting, etc. The gathered information may be used to further determine the type of data in the electronic communications and the product/service being marketed to the users.

The monitoring system 120 may query accessible databases to identify common attributes of the subset of users where it has been determined that their personal data has been breached. For example, the monitoring system 120 may query a human resources information system that is used by the user's employer, e.g., Workday® platform, or the like, to determine common attributes, e.g., gender, age, height, weight, financial institution affiliations, medical conditions, prescription drug usage, travel history, online activity, etc., of the subset of users where a determination has been made that their personal data has been breached. For example, querying a human resources information system used by a user's employer may identify common attributes, e.g., enrollment in a particular medical plan, enrollment in a particular retirement/investment plan, etc., thereby enabling the list of potential sources of data breach to be further narrowed down in order to identify the potential sources of data breach with high confidence. As one example, querying a database similar to the human resources information system may reveal that an overwhelming majority of the users within the subset of users whose personal data has been breached are members of a particular healthcare plan, insurance company, employed by a particular company, etc., therefore narrowing the potential sources of the data breach to particular insurance companies, particular employers, particular healthcare plans, etc. It is appreciated that querying the database(s) for determining commonalities among the subset of users whose personal information has been breached may be done in compliance with privacy rules and applicable regulations. For example, querying the database (s) for healthcare insurance companies or healthcare providers may be done in compliance with a Health Insurance Portability and Accountability Act (HIPAA).

According to some embodiments, the monitoring system 120 may utilize the marketing content, the possible sources of data breach, and/or common attributes of the subset of users whose personal information has been breached, to predict with confidence the potential source of the data breach. For example, the marketing content, the possible sources of data breach and common attributes of the users whose data has been breached may lead to the possible source of data breach being determined to be a financial institution, e.g., a credit card company, or a brick and mortar store, e.g., Walmart®, HomeDepot®, etc., or a medical provider, e.g., particular healthcare provider such as Kaiser Permanente®.

It is appreciated that the monitoring system 120 may employ various schemes including machine learning algorithms and/or artificial intelligence (AI) to identify anomalies, determine the marketing content, determine the potential sources of the data breach, determine users' common attributes, and identify and predict the potential source of the data breach with confidence. In other words, the monitoring system 120 may perform data mining including anomaly detection, as presented above, to identify unusual data records. Moreover, the monitoring system 120 may further search for relationships between data, e.g., relationships between the marketing content and potential sources of the data breach, relationships between users' common attributes and potential sources of data breach, etc. In other words, the monitoring system 120 performs association rule learning. Furthermore, the monitoring system 120 performs clustering on the data to discover groups, e.g., subsets of users whose data has been breached, data type identification associated with possible sources of the data breach, users' common attributes and their nexus to the possible sources of the data breach, etc. In some examples, the monitoring system 120 performs classification of the information to generalize an emerged structure such that it can be applied to new data, e.g., a newly identified anomaly being applied to new data, a newly identified data type and its linkage to possible sources of the data breach, etc.

In some examples, the monitoring system 120 may perform natural language processing, text mining (that may include statistical pattern learning, sentiment analysis, deriving patterns within the structure data, lexical analysis, tagging/annotation, etc.), speech recognition, pattern recognition, etc., on the electronic communications to detect an anomaly and/or identify the marketing content and further to identify the type of data breach used. It is further appreciated that machine learning and AI may further be used in identifying potential sources of the data breach, and may further use machine learning to identify source of the data breach with high confidence based on the marketing content and further based on the type of data breach.

Machine learning algorithms may use training data from prior known marketing campaigns to determine an anomaly in the electronic communications. Machine learning algorithms may use training data to identify the marketing content or to identify the type of data breach. In other examples, machine learning algorithms may use training data that link the marketing content to the possible sources of the data breach. Moreover, machine learning algorithms may use training data to identify the common attributes of the users and further to narrow down the potential sources of data breach. Machine learning algorithms may subsequently learn from other instances of data breaches, marketing campaigns, anomalies, etc., in order to more accurately determine future anomalies, identify marketing content, identify potential sources of data source breach, identify common user attributes, and further identify potential sources of data breach with high confidence.

In some examples, the machine learning algorithms detect anomalies, perform association rule learning to search for relationships between variables, conduct clustering to discover and to structure as presented above, perform classification to generalize identified structures when applied to new data, etc. It is appreciated that machine learning may employ various methods and algorithms, e.g., instance-based algorithms, regression analysis algorithms, regularization algorithms, classifiers, feature extraction, feature selection, partial least squares regression, linear discriminant analysis, independent component analysis, ensemble learning, meta learning, reinforcement learning, supervised learning (i.e. artificial neural network, association rule learning, case-based reasoning, Gaussian process regression, minimum message length (decision trees, decision graphs, etc.), random forests, ensembles of classifiers, information fuzzy network, quadratic classifiers, Bayesian network, etc.), Bayesian statistics, decision tree algorithms, linear classifiers, unsupervised learning, artificial neural networks (i.e. feedforward neural network, recurrent neural network, logic learning machine, etc.), association rule learning (i.e. Apriori algorithm, Éclat algorithm, etc.), hierarchical clustering, cluster analysis, anomaly detection (i.e. k-nearest neighbors classification, local outlier factor, etc.), semi-supervised learning, deep learning, or the like.

It is appreciated that the number of users and telemarketing sources described is for illustrative purposes and should not be construed as limiting the scope of the embodiments. Moreover, it is appreciated that while the embodiments are described with respect to telephony, e.g., telephone calls, voice messages, text messages, etc., the embodiments are not limited thereto and should not be construed as limiting the scope. For example, the system described above is equally applicable to any electronic communication system, e.g., email.

Figure 2:
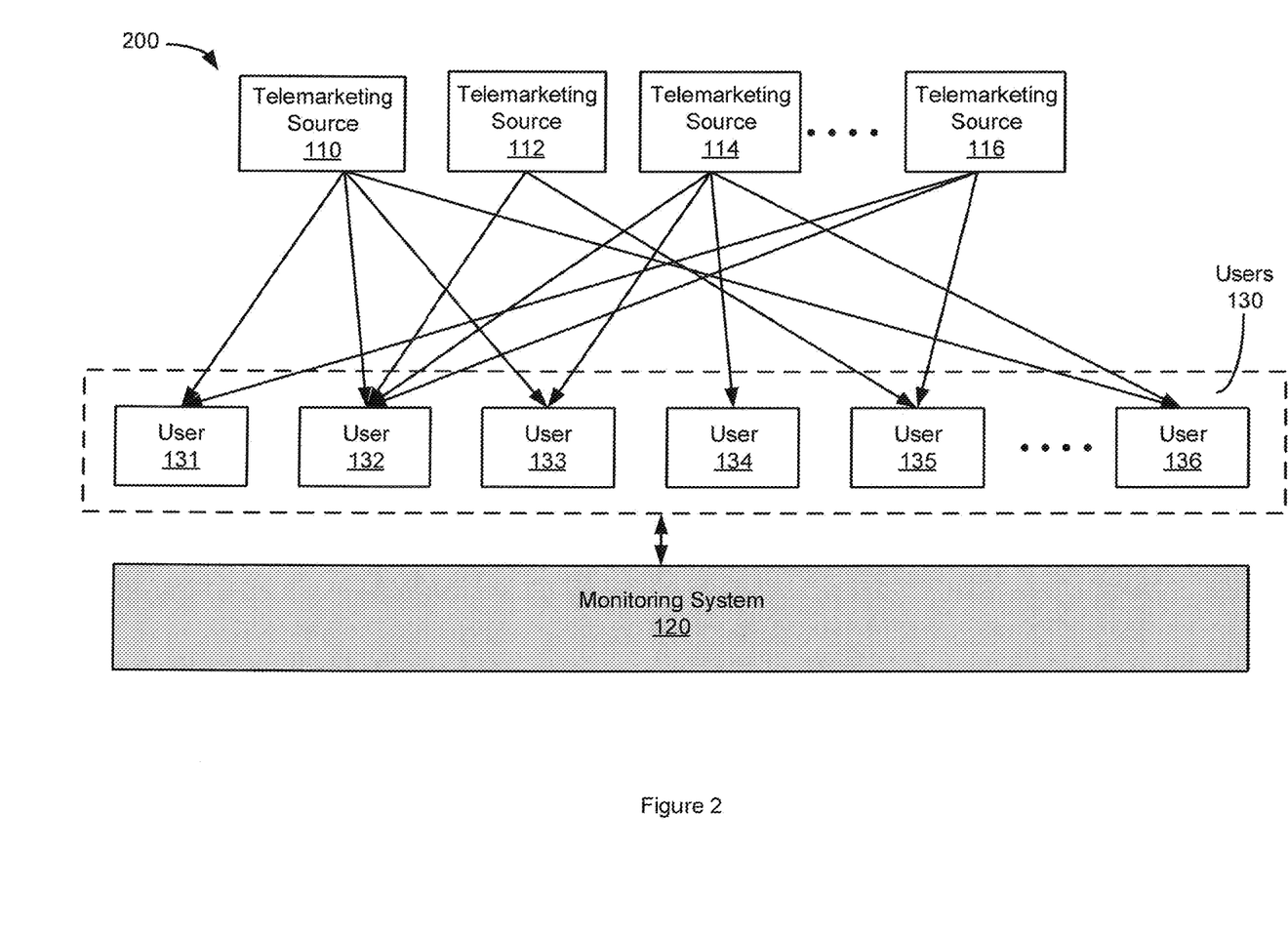
FIG. 2 is another block diagram depicting an example of a system suitable for identifying data breaches based on marketing campaigns launched, via electronic communications, that are directed to users according to some embodiments.

FIG. 2 is another block diagram 200 depicting an example of a system suitable for determining data breaches based on marketing campaigns, via electronic communications, that are directed to users according to some embodiments. Block diagram 200 is substantially similar to that of FIG. 1 except that the monitoring system 120 receives the electronic communications from the users 130. In other words, the users 130 transmit and report the electronic communications, e.g., spam calls, telemarketing calls, etc., received from one or more telemarketing source(s) to the monitoring system 120 for further analysis instead of the monitoring system 120 automatically intercepting the electronic communications between the telemarketing sources and the users 130.

Figure 3:
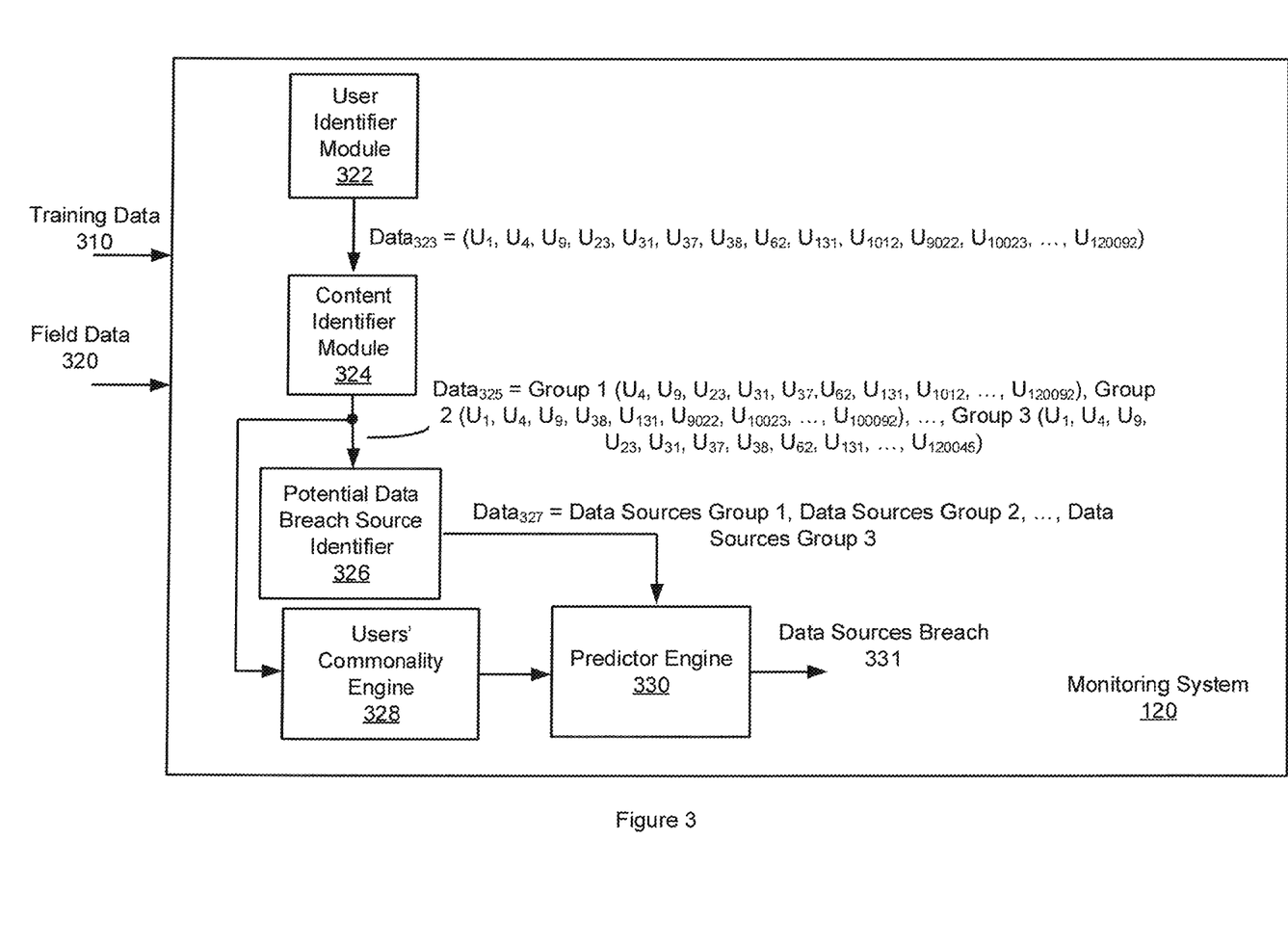
FIG. 3 is a block diagram depicting an example of a processing system suitable for identifying data breaches based on marketing campaigns launched, via electronic communications, that are directed to users according to some embodiments.

FIG. 3 is a block diagram depicting an example of a processing system suitable for determining data breaches based on marketing campaigns, via electronic communications, that are directed to users according to some embodiments. FIG. 3 illustrates the operation of the monitoring system 120 that is substantially similar to that of FIG. 1. The monitoring system 120 receives training data 310 in order to train the machine learning algorithm and/or AI in order to detect anomalies in electronic communications directed to the users, to identify the marketing content or to identify the type of data breach used in the marketing campaigns, to identify the potential sources of data breach, to identify common attributes of the users where an anomaly has been detected, and finally to identify the sources of a potential data breach with high confidence. Once the machine learning algorithms and/or AI modules have been configured based on the training data 310, the monitoring system 120 receives field data 320, e.g., electronic communications or information related thereto used in marketing campaigns.

The user identifier module 322 applies the trained machine learning algorithm and AI to the received field data 320 to identify anomalies associated with a subset of the users. In this illustrate example, the user identifier module 322 identifies users $U_1$, $U_4$, $U_9$, $U_{23}$, $U_{31}$, $U_{37}$, $U_{38}$, $U_{62}$, $U_{131}$, $U_{1012}$, $U_{9022}$, $U_{10023}$, ..., and $U_{120092}$ as a subset of users where anomalies associated with electronic communication has been detected. The subset of users may be communicated via $Data_{323}$ to the marketing content identifier module 324. The marketing content identifier module 324 applies machine learning and AI to the received electronic communications for the subset of users to identify the marketing content, as discussed above. For example, the marketing content may be determined to be medical related, drug related, e-commerce related, etc.

The marketing content identifier module 324 may group and cluster the users into different groups based on their content. The marketing content identifier module 324 may form groups 1, 2, ..., 3 where each group includes users where the electronic communications used in marketing campaigns contains or is produced according to certain type of data (e.g., financial, health, etc.). For example, group 1 may include users $U_4$, $U_9$, $U_{23}$, $U_{31}$, $U_{37}$, $U_{62}$, $U_{131}$, ..., and $U_{120092}$ that share a similar data type (e.g., financial) used in the electronic communications. Group 2 may include users $U_1$, $U_4$, $U_9$, $U_{38}$, $U_{131}$, $U_{9022}$, $U_{10023}$, ..., and $U_{120092}$ that share a similar data type (e.g., healthcare related) used in the electronic communications. Group 3 may include users $U_1$, $U_4$, $U_9$, $U_{23}$, $U_{31}$, $U_{37}$, $U_{38}$, $U_{62}$, $U_{131}$, ..., and $U_{120045}$ that share a similar data type (e.g., product related) used in the electronic communications. It is appreciated that as illustrated the groups may not necessarily be exclusive. In other words, some users may appear in different groups. It is further appreciated that the number of users shown, the number of groupings shown, etc., is for illustrative purposes and should not be construed as limiting the scope of the embodiments.

Data$_{325}$ from the marketing content identifier module 324 may be transmitted to the potential data breach source identifier module 326 as well as the users' commonality engine 328. As described above, the marketing content identifier module 324 may apply machine learning and AI to electronic communications for each group of users (each group sharing at least one or more common type of data, e.g., directed to a prescription drug, directed to a medical treatment, directed to an online product previously purchased, etc.) to identify the potential data breach source. For example, if the marketing content is promoting a particular drug then potential data breach sources may be a healthcare provider, an insurance company, a cloud system for storing medical records, etc. As such, the potential data breach source identifier 326 outputs Data$_{327}$ for identifying the possible source of the data breach for each group of users.

It is appreciated that the users' commonality engine 328 may also receive Data$_{325}$ and apply machine learning and AI to the electronic messages of the identified groups of users to identify common attributes of the users within each group. For example, a common attribute within group 1 may be that the users are under 26 years old and that they are all male. In another example, a common attribute within group 3 may be that the users have all been diagnosed with a form of gastrointestinal disorder in the past and that they are over the age of 47 and are within a particular geographical region. The output of the users' commonality engine 328 and Data$_{327}$ are transmitted to the predictor engine 330. The predictor engine 330 may use machine learning and AI to further narrow down the potential data breach source based on the common attributes of the users within each group. Accordingly, the predictor engine 330 may output a data breach sources 331 that identifies the source(s) of the data breach with high confidence.

Figure 4:
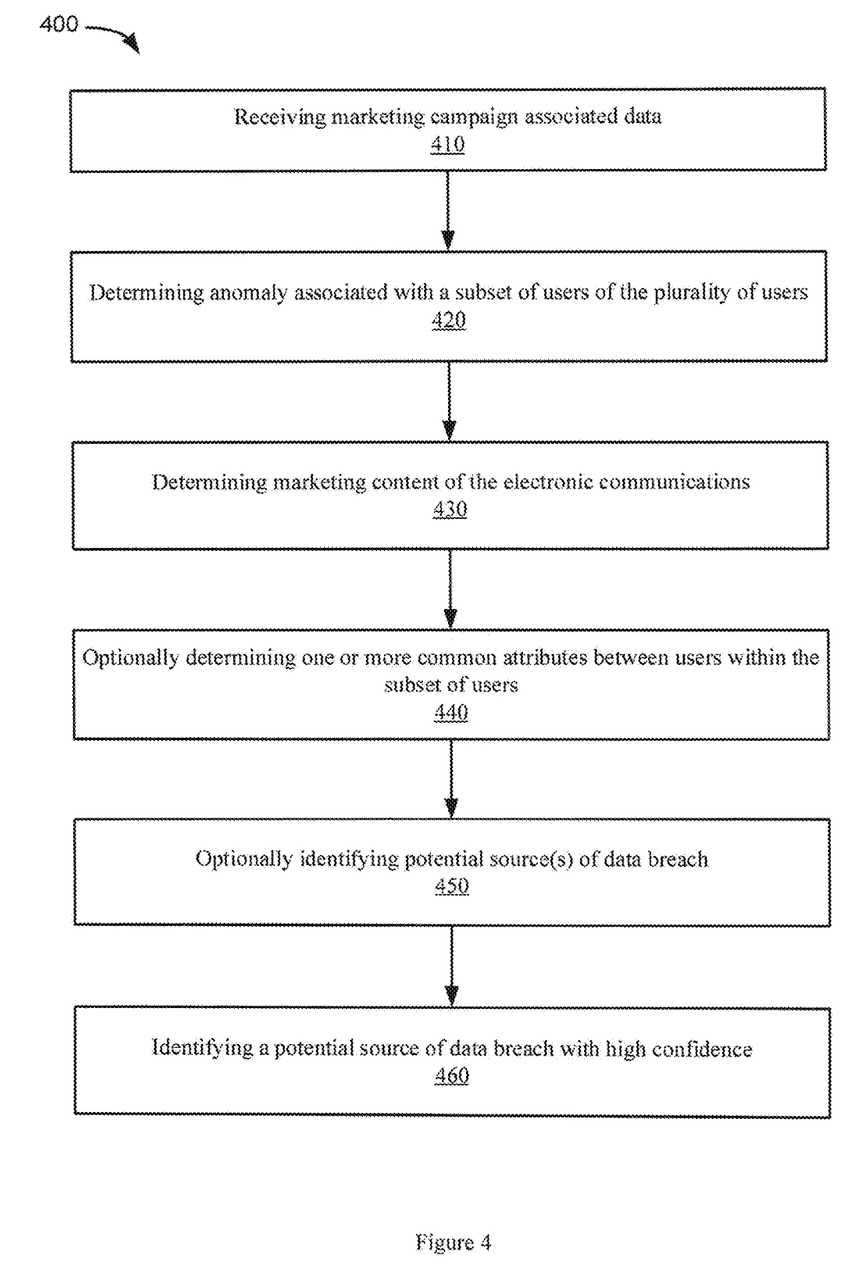
FIG. 4 is a flow chart illustrating an example of method flow for identifying a data breach source in accordance with some embodiments.

It is appreciated that the monitoring system 120 may be similar to that of FIG. 1. As such, the monitoring system 120 may automatically initiate an electronic communication, e.g., a telephone call, to a telemarketing source to obtain additional information regarding the marketing content, or to determine whether a marketing campaign directed by the telemarketing source to the user has triggered an anomaly associated with a potential data breach, or to identify potential sources of data breach. FIG. 4 is a flow chart illustrating an example of method flow 400 for identifying a data breach source in accordance with some embodiments. The flow diagram 400 is substantially similar to the system described in FIG. 1, FIG. 2, and FIG. 3. At step 410, marketing campaign associated data, e.g., electronic communications such as a voice message, a text, an email, phone calls, pattern of electronic communications, user behavior pattern, etc., for marketing campaign launched by one or more telemarketing source(s) directed to a plurality of users is received. At step 420, one or more anomalies associated with a subset of users of the plurality of users is determined based on the marketing campaign associated data. In some embodiments, machine learning algorithm(s) may be applied to identify anomalies based on a pattern, e.g., electronic communication pattern, user behavior pattern (picking up a call and hanging up within a certain period of time, e.g., less than 2 seconds, or picking up a call and hanging up without saying anything, declining a call from certain phone numbers (e.g., same phone number as the user, same area code and same first 3-digit number, etc.) by manipulating the user device such as pressing a key or icon (virtual or mechanical) on a smart phone), pattern of marketing campaign, etc., as described above. It is further appreciated that the anomalies may be substantially similar to those described with respect to FIG. 1, FIG. 2, and FIG. 3 and may be determined as described above. In some examples, the anomalies may be based on an audio signature of the telephony communications, as described above. The audio signature may include a length of a message, an audio signature of a background noise, a length of time prior to start of voice message, etc., as described above.

In other examples, the anomalies may be detected by determining that the electronic messages are being disguised as being initiated from different telemarketing sources even though they are in fact being initiated from a single telemarketing source, e.g., electronic messages being transmitted from a single source but with different telephone numbers, electronic messages being transmitted from a single source but with different email addresses, etc., as described above. Detection of one or more anomalies may be indicative of user data being breached, as presented above.

At step 430, marketing content of the electronic communications, e.g., telephony communication, etc., may be determined, as described above with respect to FIG. 1, FIG. 2, and FIG. 3. Optionally at step 440, one or more common attributes of the subset of users may be determined, as described above. It is appreciated that determining the one or more common attributes may be by querying a database, e.g., human resources database, as described above.

At step 450, optionally, one or more potential source(s) of data breach is identified, as described above. It is appreciated that identifying the potential sources of data breach may be determined based on the marketing content and/or one or more common attributes among users. At step 460, at least a potential source of data breach may be identified, as described above.

It is appreciated that the machine learning algorithm(s) and/or AI algorithms may automatically learn from patterns associated with other marketing campaigns to automatically update the machine learning algorithm. Thus, machine learning and AI will more accurately identify potential sources of a data breach by identifying anomalies, identifying marketing content, determining common attributes among users, etc. It is appreciated that in some embodiments, for steps 420 and/or 430, the monitoring system may automatically contact one or more telemarketing sources to gather additional data. Thus, the marketing content identification and/or anomaly may be further based on the additional gathered data.

Figure 5:
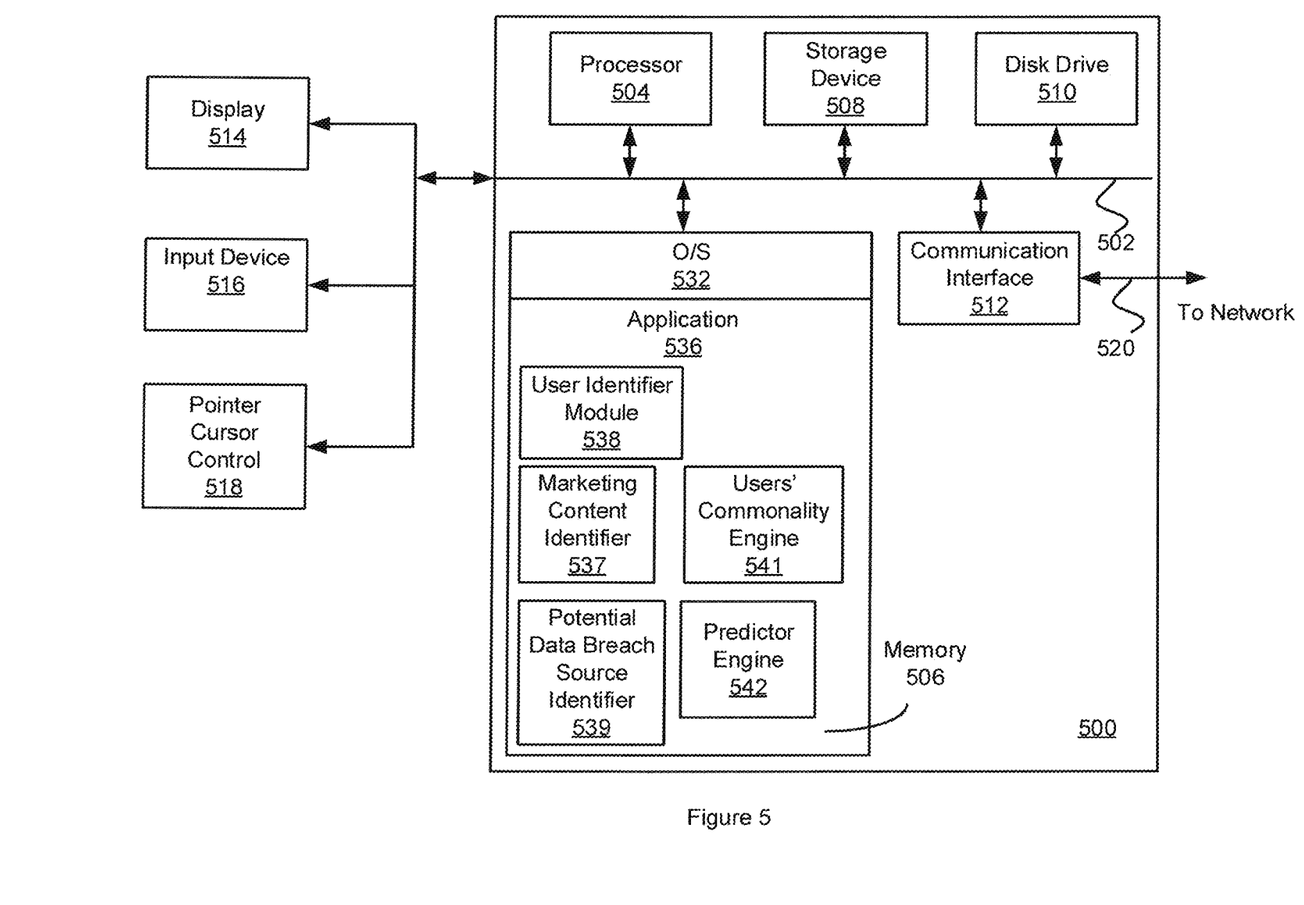
FIG. 5 is a block diagram depicting an example of computer system suitable for identifying a data breach source in accordance with some embodiments.

Referring now to FIG. 5, an exemplary block diagram of a computer system suitable for identifying a data breach source in accordance with some embodiments is shown. In some examples, computer system 500 can be used to implement computer programs, applications, methods, processes, or other software to perform the above-described techniques and to realize the structures described herein. Computer system 500 includes a bus 502 or other communication mechanism for communicating information, which interconnects subsystems and devices, such as a processor 504, a system memory ("memory") 506, a storage device 508 (e.g., ROM), a disk drive 510 (e.g., magnetic or optical), a communication interface 512 (e.g., modem or Ethernet card), a display 514 (e.g., CRT or LCD), an input device 516 (e.g., keyboard), and a pointer cursor control 518 (e.g., mouse or trackball). In one embodiment, pointer cursor control 518 invokes one or more commands that, at least in part, modify the rules stored, for example in memory 506, to define the electronic message preview process.

According to some examples, computer system 500 performs specific operations in which processor 504 executes one or more sequences of one or more instructions stored in system memory 506. Such instructions can be read into system memory 506 from another computer readable medium, such as storage device 508 or disk drive 510. In some examples, hard-wired circuitry can be used in place of or in combination with software instructions for implementation. In the example shown, system memory 506 includes modules of executable instructions for implementing an operation system ("O/S") 532, an application 536 (e.g., a host, server, web services-based, distributed (i.e., enterprise) application programming interface ("API"), program, procedure or others). Further, application 536 includes a user identifier module 538 that receives electronic communications directed to a set of users. The user identifier module 538 is configured to identify a subset of users with anomalous electronic communications. The application 536 further includes a marketing content identifier module 537 to identify the content of data. The application 536 further includes a potential data breach source identifier module 539 that identifies potential sources of data breach. The application 536 also includes a users' commonality engine 541 that identifies one or more common attributes among the subset of users for whom anomalous communications has been detected. The application 536 further includes a predictor engine 542 that predicts a source of a data breach with high confidence. It is appreciated that the operation of the user identifier module 538, marketing content identifier module 537, data breach source identifier module 539, users' commonality engine 541, and predictor engine 542 are described in detail with respect to FIG. 1, FIG. 2, FIG. 3, and FIG. 4.

The term "computer readable medium" refers, at least in one embodiment, to any medium that participates in providing instructions to processor 504 for execution. Such a medium can take many forms, including but not limited to, non-volatile media, volatile media, and transmission media. Non-volatile media includes, for example, optical or magnetic disks, such as disk drive 510. Volatile media includes dynamic memory, such as system memory 506. Transmission media includes coaxial cables, copper wire, and fiber optics, including wires that comprise bus 502. Transmission media can also take the form of acoustic or light waves, such as those generated during radio wave and infrared data communications.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, electromagnetic waveforms, or any other medium from which a computer can read.

In some examples, execution of the sequences of instructions can be performed by a single computer system 500. According to some examples, two or more computer systems 500 coupled by communication link 520 (e.g., LAN, PSTN, or wireless network) can perform the sequence of instructions in coordination with one another. Computer system 500 can transmit and receive messages, data, and instructions, including program code (i.e., application code) through communication link 520 and communication interface 512. Received program code can be executed by processor 504 as it is received, and/or stored in disk drive 510, or other non-volatile storage for later execution. In one embodiment, system 500 is implemented as a hand-held device. But in other embodiments, system 500 can be implemented as a personal computer (i.e., a desktop computer) or any other computing device. In at least one embodiment, any of the above-described delivery systems can be implemented as a single system 500 or can implemented in a distributed architecture including multiple systems 500.

In other examples, the systems, as described above, can be implemented from a personal computer, a computing device, a mobile device, a mobile telephone, a facsimile device, a personal digital assistant ("PDA") or other electronic device.

In at least some of the embodiments, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Alternatively, the elements and their functionality can be subdivided into constituent sub-elements, if any. As software, the above-described techniques can be implemented using various types of programming or formatting languages, frameworks, syntax, applications, protocols, objects, or techniques, including C, Objective C, C++, C #, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

Figure 6:
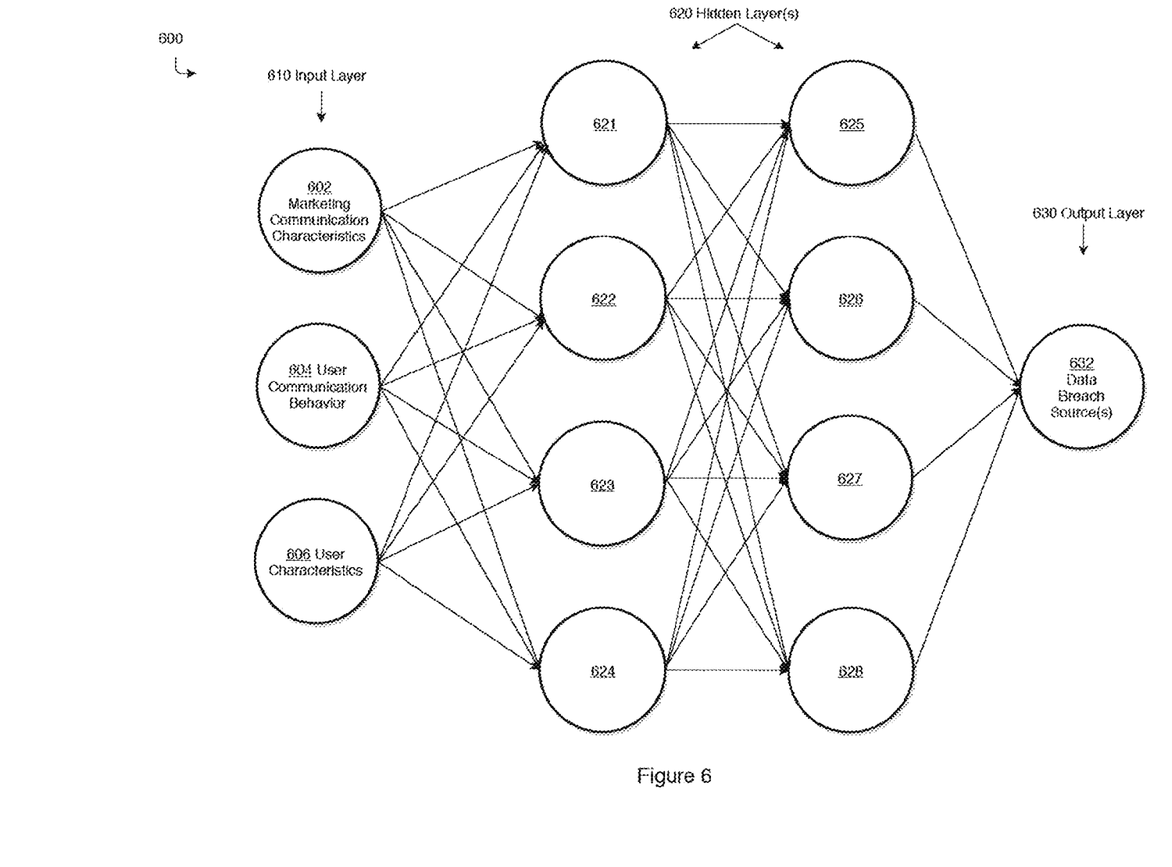
FIG. 6 is a relational node diagram depicting an example of a neural network for identifying a data breach source, in accordance with some embodiments.

FIG. 6 is a relational node diagram depicting an example of a neural network for identifying a data breach source, in accordance with some embodiments. In an example embodiment, the neural network 600 utilizes an input layer 610, one or more hidden layers 620, and an output layer 630 to train the machine learning algorithm(s) or model to detect sources of data breaches. In some embodiments, where data breaches have already been confirmed, supervised learning is used such that known input data, a weighted matrix, and known output data are used to gradually adjust the model to accurately compute the already known output. Once the model is trained, field data is applied as input to the model and a predicted output is generated. In other embodiments, where data breaches have not yet been confirmed, unstructured learning is used such that a model attempts to reconstruct known input data over time in order to learn. FIG. 6 is described as a structured learning model for depiction purposes and is not intended to be limiting.

Training of the neural network 600 using one or more training input matrices, a weight matrix, and one or more known outputs is initiated by one or more computers associated with the monitoring system 120. In an embodiment, a server may run known input data through a deep neural network in an attempt to compute a particular known output. For example, a server uses a first training input matrix and a default weight matrix to compute an output. If the output of the deep neural network does not match the corresponding known output of the first training input matrix, the server adjusts the weight matrix, such as by using stochastic gradient descent, to slowly adjust the weight matrix over time. The server computer then re-computes another output from the deep neural network with the input training matrix and the adjusted weight matrix. This process continues until the computer output matches the corresponding known output. The server computer then repeats this process for each training input dataset until a fully trained model is generated.

In the example of FIG. 6, the input layer 610 includes a plurality of training datasets that are stored as a plurality of training input matrices in a database associated with the monitoring system 120. The training input data includes, for example, marketing communication characteristics 602, user communication behavior 604, user characteristics 606, and so forth. Any type of input data can be used to train the model.

In an embodiment, data on marketing communication characteristics 602 is used as one type of input data to train the model. Marketing communication characteristics 602 data is input data related to the characteristics of marketing communications, such as the length of a call or voice message, the audio signature of background noises in a call or voice message, the length of time before the start of an automated message, specific words or content featured in a call or voice message, the number of calls from the same number, a pattern of calls, such as a specific time of day during which the calls are made or multiple calls in sequence, and/or any other data related to marketing communications.

In an embodiment, data on user communication behavior 604 is also used as another type of input data to train the model. User communication behavior 604 data is input data related to a user's behavior in response to receiving a communication, such as, for example, the duration of a call before a user disconnects, the presence or absence of an audio response from the user, user input accepting a call or declining to take a call without answering, user input accepting a call or declining to take a call from a particular number, user input accepting a call or declining to take a call from a particular area code, and/or any other data related to user behavior in response to receiving communications.

In an embodiment, data on user characteristics 606 is also used as another type of input data to train the model. User characteristics 606 data is input data related to a user. The data can be personal or behavioral. For example, personal data can include a user's name, age, address, or any other personal information. Behavioral data can include location-based behavior, such as visiting a particular gym, grocery store, hotel, and so forth at a certain geographical location, and/or product-based or service-based behavior, such as purchasing a certain product or service from a physical or online store. Any type of personal or behavioral data can be used as input data.

In the embodiment of FIG. 6, hidden layers 620 represent various computational nodes 621, 622, 623, 624, 625, 626, 627, 628. The lines between each node 621, 622, 623, 624, 625, 626, 627, 628 represent weighted relationships based on the weight matrix. As discussed above, the weight of each line is adjusted overtime as the model is trained. While the embodiment of FIG. 6 features two hidden layers 620, the number of hidden layers is not intended to be limiting. For example, one hidden layer, three hidden layers, ten hidden layers, or any other number of hidden layers may be used for a standard or deep neural network. The example of FIG. 6 also features an output layer 630 with data breach source(s) 632 as the known output. The data breach source(s) 632 indicate one or more sources of a particular data breach. For example, the data breach source 632 may be one or more names of particular organizations that have experienced a known data breach. As discussed above, in this structured model, the data breach source 632 is used as a target output for continuously adjusting the weighted relationships of the model. When the model successfully outputs the data breach source(s) 632, then the model has been trained and may be used to process live or field data.

Once the neural network 600 of FIG. 600 is trained, the trained model will accept field data at the input layer 610, such as current marketing communication characteristics, current user communication behavior, and current user characteristics. In some embodiments, the field data is live data that is accumulated in real time. In other embodiments, the field data may be current data that has been saved in an associated database. The trained model is applied to the field data in order to generate one or more predicted data breach sources at the output layer 630. For instance, a trained model can identify a pattern of sudden increases in telemarketing calls. These particular telemarketing calls have a particular audio profile of two seconds of silence followed by ten seconds of automated recording for a total audio length of exactly 12 seconds. Moreover, the calls occur between 11:00 am and 1:00 pm on weekdays. The trained model further identifies that this particular telemarketing call was targeted only at users who purchased items from a particular hardware store within the past 15 days. Consequently, the trained model will predict that this particular hardware store, a particular datacenter associated with the hardware store, and/or particular database(s) associated with the particular hardware store, are the source of a potential data breach and generate this data breach source as the output. In some embodiments, the monitoring system 120 generates a notification of the potential data breach and sends the notification to a security administrator for review. In other embodiments, the monitoring system 120 sends the notification directly to the source of the potential data breach.

Figure 7:
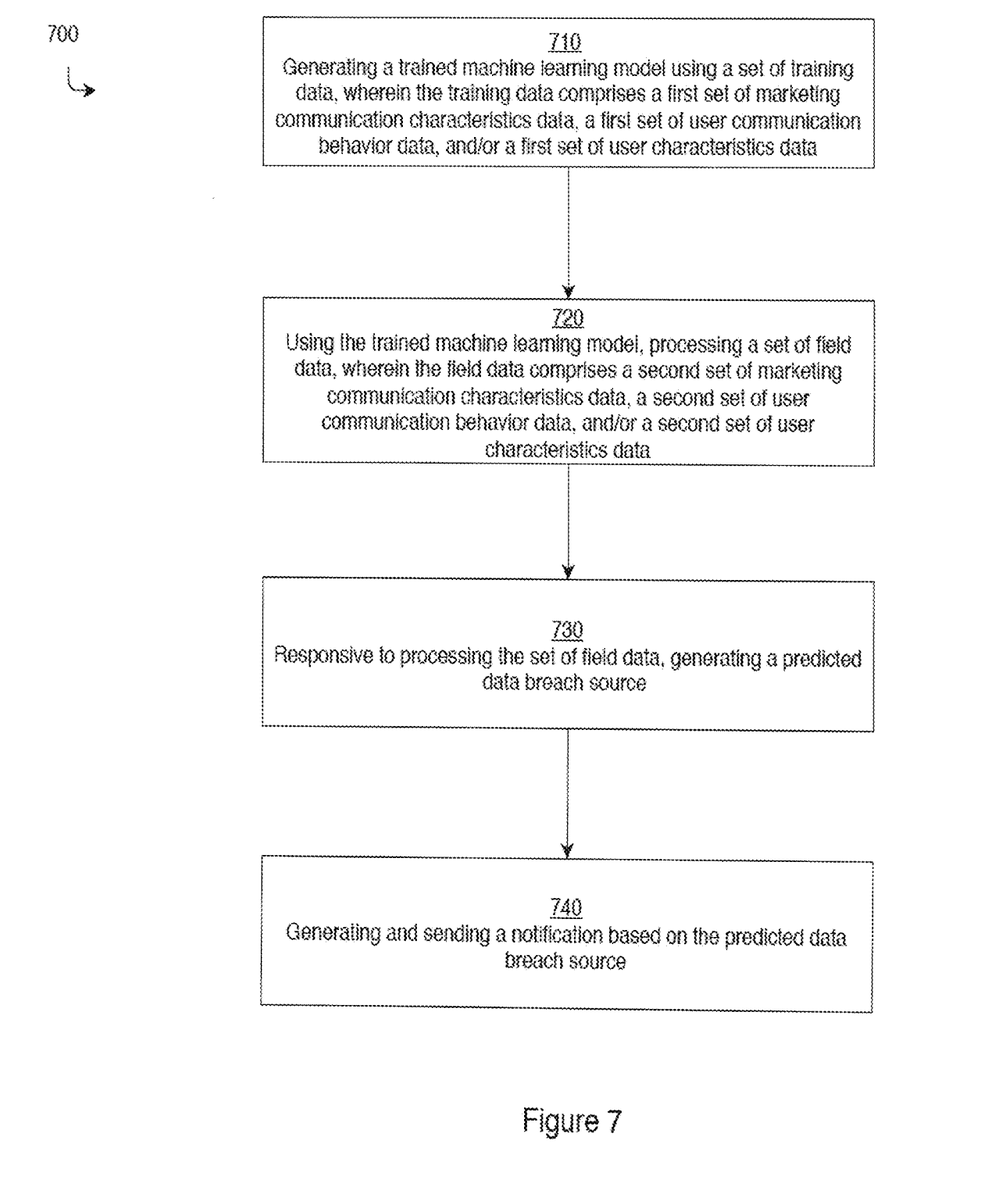
FIG. 7 is a flow chart illustrating an example method flow for identifying a data breach source, in accordance with some embodiments.

FIG. 7 is a flow chart illustrating an example method flow 700 for identifying a data breach source, in accordance with some embodiments. At step 710, one or more computers generate a trained machine learning model using a set of training data. The one or more computers are, for example, one or more servers associated with the monitoring system 120. The machine learning model is, for example, the neural network 600 of FIG. 6. The neural network 600 is trained using structured or unstructured machine learning techniques, as previously described herein.

The set of training data that is used to train the model includes, for example, a first set of marketing communication characteristics data, a first set of user communication behavior data, and/or a first set of user characteristics data, as previously described herein. In some embodiments, additional training data, such as publicly available training data and/or raw data obtained from third party partners are also used. For example, some third-party partner enterprises that are interested in detecting future data breaches will provide all available raw data about their customers in order to train a model that is specifically configured for identifying data breaches for their particular enterprise. In some embodiments, the set of training data also includes, for example, a confirmed data breach source as the known output. For example, in the case of structured machine learning, the set of training data includes both the known inputs of marketing communication characteristics, user communication behavior, and/or user characteristics, as well as the known output of a confirmed source of a data breach, such as a particular company. In other embodiments, in the case of unstructured machine learning, the set of training data is unlabeled data pertaining to marking communication characteristics, user communication behavior, and/or user characteristics.

At step 720, once the machine learning model is trained, the trained machine learning model processes a set of field data. Processing the set of field data includes running the field data through the trained model in order to generate an output. The field data includes, for example, a second set of marking communication characteristics data, a second set of user communication behavior data, and/or a second set of user characteristics data. In an embodiment, the first set of data, which is the training dataset, differs from the second set of data, which is the field dataset. In some embodiments, the second set of data is an updated or then-current version of the first set of data.

At step 730, a predicted data breach source is generated in response to processing the set of field data. For example, once the trained model finishes processing the set of field data, the trained model will output a specific entity that potentially experienced a data breach. In an embodiment, the output is the name of the entity. In another embodiment, the output is a name or location of a particular datacenter or even a particular database that stores a specific type of data for that entity. For example, targeted marketing communications for specific vehicle parts and accessories indicates that a database related to a dealer's parts sales department likely experienced a breach, while targeted marketing communications for vehicle financing indicates that a database related to a dealership's financing department likely experienced a breach.

At step 740, the one or more computers are configured to generate a notification based on the predicted data breach source. In some embodiments, multiple notifications are generated. In some instances, a notification is a potential data breach warning featuring the name of the entity. In other instances, a notification is a potential data breach warning featuring the name or location of a datacenter associated with the entity, or the name or location of a database associated with the entity. In some embodiments, the notification is sent to a security administrator for further evaluation. In other embodiments, the notification is sent directly to the entity that experienced the potential data breach. The notification(s) may be sent via E-mail, Short Message Service (SMS) or Multimedia Messaging Service (MMS) messages, chat messages, automated calls, or any other method of communication.

In some embodiments, the set of field data at step 720 is a first set of field data, the predicted data breach source at step 730 is a first predicted data breach source, and the notification at step 740 is a first notification. The trained machine learning model is subsequently used to process a second set of field data. For example, the second set of field data includes a third set of marking communication characteristics data, a third set of user communication behavior data, and/or a third set of user characteristics data. In an embodiment, this second set of field data differs from the training data and the first set of field data. In some embodiments, the second set of field data is an updated or then-current version of the first set of data. A second predicted data breach source is generated in response to processing the second set of field data and a second notification is generated and sent based on the second predicted data breach source.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A method comprising: receiving marketing campaign associated data after a marketing campaign is launched by one or more telemarketing sources, and wherein the marketing campaign associated data is received by a plurality of users via telephony communications;
   applying a machine learning algorithm to the received marketing campaign associated data to determine anomalies associated with a subset of users of the plurality of users receiving the marketing campaign associated data, wherein the determining is based on audio signature of the telephony communications or based on telephony communications from a same source being disguised as different sources;
   identifying a marketing content from the received marketing campaign associated data within the telephony communications for the subset of users;
   determining one or more common attributes between users within the subset of users;
   and identifying a source of data breach based on the marketing content and further based on the one or more common attributes.

2. The method as described in claim 1, wherein the telephony communications are selected from a group consisting of short message service (SMS), voice message, and telephone call.

3. The method as described in claim 1, wherein the determining anomalies associated with the subset of users is based on a pattern associated with the marketing campaign.

4. The method as described in claim 1, wherein the machine learning algorithm automatically learns from patterns associate with other marketing campaigns to automatically update the machine learning algorithm.

5. The method as described in claim 1 further comprising:
   automatically contacting a subset of the one or more telemarketing sources; and
   gathering additional data based on the contacting, wherein the identifying the marketing content and the identifying the source of data breach is further based on the gathered additional data.

6. The method as described in claim 1, wherein the audio signature is based on a length of a message, an audio signature of a background noise, or a length of time prior to start of a voice message.

7. The method as described in claim 1, wherein the anomalies are based on a pattern of user behavior responsive to receiving the telephony communications, wherein the pattern of user behavior is selected from a group consisting of hanging up the telephony communications in less than a predetermined amount of time, hanging up the telephony communications without audio response from the user, declining to answer the telephony communications from a number sharing a same area code and first three digits of the user phone number, and declining to answer the telephony communications from a number sharing a same area code and telephone number as the user by manipulating the user device.

8. A method comprising: receiving marketing campaign associated data after a marketing campaign is launched by one or more telemarketing sources; and wherein the marketing campaign associated data is received by a plurality of users via electronic communications;
   applying a machine learning algorithm to the received marketing campaign associated data to determine anomalies associated with a subset of users of the plurality of users that receives the marketing campaign associated data, wherein the anomalies are indication that personal data associated with the subset of users has been breached;

identifying a marketing content from the received marketing campaign associated data within the electronic communications for the subset of users;

and based on the identifying, determining potential sources of data breach where data associated with the subset of users has been breached.

9. The method as described in claim 8 further comprising accessing one or more databases to identify one or more common attributes between users within the subset of users.

10. The method as described in claim 9 further comprising identifying a source of data breach from the potential sources of data breach based on the one or more common attributes.

11. The method as described in claim 8, wherein the electronic communications are selected from a group consisting of short message service (SMS), voice message, telephone call, and email.

12. The method as described in claim 8, wherein the determining anomalies associated with the subset of users is based on a pattern associated with the marketing campaign.

13. The method as described in claim 12, wherein the anomalies are based on audio signature of the electronic communications being a same as audio signature of other known telemarketing sources or based on electronic communications from a same source being disguised as different sources.

14. The method as described in claim 13, wherein the different sources are selected from a group consisting of telephone numbers, and email addresses.

15. The method as described in claim 12, wherein the machine learning algorithm automatically learns from patterns associated with other marketing campaigns to automatically update the machine learning algorithm.

16. The method as described in claim 8 further comprising:

automatically contacting a subset of the one or more telemarketing sources; and gathering additional data based on the contacting, wherein the identifying the marketing content and the determining the potential sources of data breach is further based on the gathered additional data.

17. A method comprising:

receiving marketing campaign associated data after a marketing campaign is launch by one or more telemarketing sources, and wherein the marketing campaign associated data is received by a plurality of users via telephony communications;

applying a machine learning algorithm to the received marketing campaign associated data that determines anomalies associated with a subset of users of the plurality of users that receives the marketing campaign associated data;

identifying a marketing content from the received marketing campaign associated data within the telephony communications for the subset of users;

querying a database storing user information for the subset of users;

determining one or more common attributes between users within the subset of users based on the query; and identifying a source of data breach based on the marketing content and further based on the one or more attributes.

18. The method as described in claim 17, further comprising:

automatically contacting a subset of the one or more telemarketing sources; and gathering additional data based on the contacting, wherein the identifying the marketing content and the identifying the source of data breach is further based on the gathered additional data.

19. The method as described in claim 17, wherein the anomalies are determined based on a length of a message, an audio signature of a background noise a length of time prior to start of voice message, audio signature of the electronic communications being a same as audio signature of other known telemarketing sources, or based on electronic communications from a same source being disguised as different sources.

20. The method as described in claim 17, wherein the anomalies are based on a pattern of user behavior responsive to receiving the telephony communications, wherein the pattern of user behavior is selected from a group consisting of hanging up the telephony communications in less than a predetermined amount of time, hanging up the telephony communications without audio response from the user, declining to answer the telephony communications from a number sharing a same area code and first three digits of the user phone number, and declining to answer the telephony communications from a number sharing a same area code and telephone number as the user.

* * * * *